United States Patent
Cotterell (10) Patent No.: US 11,220,198 B2
(45) Date of Patent: Jan. 11, 2022

(54) HEADREST COVER HOLDER SYSTEM

(71) Applicant: Lascelles Cotterell, Pickering (CA)

(72) Inventor: Lascelles Cotterell, Pickering (CA)

( * ) Notice: Subject to any disclaimer, the term of this patent is extended or adjusted under 35 U.S.C. 154(b) by 0 days.

(21) Appl. No.: 17/024,171

(22) Filed: Sep. 17, 2020

(65) Prior Publication Data

US 2021/0001760 A1 Jan. 7, 2021

Related U.S. Application Data (63) Continuation-in-part of application No. 15/914,105, filed on Mar. 7, 2018, now abandoned.

(51) Int. Cl.
*B60N 2/80* (2018.01)
*B60N 2/879* (2018.01)

(52) U.S. Cl.
CPC .................. *B60N 2/879* (2018.02)

(58) Field of Classification Search
CPC .... B60N 2/879; B60N 2/58; B64D 11/00152; B64D 11/0605; B64D 11/0629; B64D 11/0015; B60R 11/0229
USPC .................... 297/391, 163, 188.04
See application file for complete search history.

(56) References Cited

U.S. PATENT DOCUMENTS

| | | | | |
|---|---|---|---|---|
| 6,786,547 B1* | 9/2004 | Chu | | B60N 2/5858 297/220 |
| 6,905,167 B2 | 6/2005 | Jost | | |
| 7,048,163 B2 | 5/2006 | Albert et al. | | |
| 7,665,804 B1* | 2/2010 | Jeffrey | | G09F 21/049 297/220 |
| 8,104,833 B2 | 1/2012 | Koontz, II et al. | | |
| 8,424,825 B2 | 4/2013 | Somuah | | |
| 9,457,731 B2 | 10/2016 | Narayanan et al. | | |
| 2003/0226148 A1* | 12/2003 | Ferguson | | B60R 11/0235 725/75 |
| 2004/0144817 A1* | 7/2004 | Albert | | B60R 11/02 224/275 |
| 2007/0257533 A1* | 11/2007 | Resendez | | B60N 2/6063 297/228.11 |
| 2010/0007805 A1* | 1/2010 | Vitito | | B60K 37/06 348/837 |
| 2011/0278885 A1* | 11/2011 | Procter | | B60R 11/0252 297/135 |
| 2013/0240587 A1 | 9/2013 | Buchhalter | | |
| 2014/0028063 A1* | 1/2014 | Firestone | | B60N 2/6081 297/188.01 |

(Continued)

FOREIGN PATENT DOCUMENTS

EP 3118055 1/2017

*Primary Examiner* — Mark R Wendell
(74) *Attorney, Agent, or Firm* — Robert C. Corbett; Technology Law, PLLC (57) ABSTRACT

A cover for a seat having a headrest includes a stabilizing bracket member that enables a secure attachment of an electronic device for use by a passenger behind the seat. In one embodiment, the cover includes a sleeve defining a chamber, a first opening to the chamber, and a second opening to the chamber. The chamber is sized and shaped to at least partially contain the headrest. The first opening is sized and positioned such that at least a portion of the headrest is insertable into the chamber through the first opening. The stablizing bracket member defines an aperture and is attached to the sleeve such that the aperture is aligned with the second opening so that the second opening is unobstructed.

14 Claims, 11 Drawing Sheets

(56) References Cited

U.S. PATENT DOCUMENTS

| | | | |
|---|---|---|---|
| 2014/0284972 A1* | 9/2014 | Riedel | B64D 11/00152 |
| | | | 297/188.04 |
| 2014/0284973 A1* | 9/2014 | Wolgast | B64D 11/00155 |
| | | | 297/188.04 |
| 2015/0123433 A1* | 5/2015 | Lamb, Jr. | B60R 11/0229 |
| | | | 297/188.05 |
| 2015/0329209 A1* | 11/2015 | Muirhead | B64D 11/0015 |
| | | | 224/275 |

* cited by examiner

HEADREST COVER HOLDER SYSTEM

CROSS-REFERENCE TO RELATED APPLICATION

This application is a continuation in part of U.S. patent application Ser. No. 15/914,105, filed Mar. 7, 2018, and which is hereby incorporated by reference in its entirety.

TECHNICAL FIELD

This disclosure relates generally to the field of storage and mounting devices and more specifically relates to a storage device attachable to a headrest.

BACKGROUND

People often travel using bus, train and airplane. As a form of entertainment to help pass time, some buses, trains and airplanes have incorporated built-in video entertainment units. Many buses, trains and airplanes now incorporate individual entertainment units for each passenger, which are often located in the upper seatbacks of passenger seats. However, often only a limited number of programming options are available on such displays. Personal electronic devices, such as tablets, computers, smartphones and mobile gaming platforms, offer additional entertainment options in comparison to the individual entertainment units. Personal electronic devices usually allow a user to store and customize their own content, so that they are not limited to the content then-stored in an individual entertainment unit. Unfortunately, a user must hold a personal electronic device in one's hands or place it on a fold-down tray table. Holding a personal electronic device for extended periods can lead to fatigue and discomfort. The use of a tray table may not provide an optimum viewing angle, and in any event, the tray table is often occupied during in-transit meals or unable to use due the seatbelt indictor light is on during flight which passengers still desire the use of their personal electronic devices. A suitable solution is desired.

SUMMARY

A headrest cover for a seat having a headrest includes a sleeve defining a chamber and a first opening to the chamber. The chamber is sized and shaped to at least partially contain the headrest. The first opening is sized and positioned such that at least a portion of the headrest is insertable into the chamber through the first opening. A bracket member is attached to the sleeve. A fastening element is attached to the bracket member and is configured to engage with an electronic device holder to connect the electronic device holder to the sleeve. The bracket member provides enhanced stability to an electronic device holder attached thereto, and, correspondingly, to any electronic device held by the device holder.

In one embodiment, the sleeve defines a second opening to the chamber, and the bracket member defines an aperture. The bracket member is attached to the sleeve such that the aperture is aligned with the second opening to the chamber. The cover improves upon the prior art by permitting access to the rearward portion of the headrest via the second opening. For example, the rearward portion of the headrest may contain printed matter such as magazines or flight safety instructions, or a pre-existing video screen, which will be visible and/or accessible to a passenger behind the seat through the second opening and the aperture of the bracket.

The bracket permits the attachment to the sleeve of an electronic device by a passenger to enable hands-free viewing of the electronic device. The alignment of the aperture of the bracket with the second opening provides enhanced stability to the electronic device while not obstructing the second opening.

More specifically, the aperture enables the bracket to engage the sleeve and the headrest over a wide surface area without obstructing the second opening, and thus without obstructing access to the rear of the headrest. Accordingly, a passenger to the rear of the seat will be able to connect a personal electronic device to the headrest cover for easier viewing while maintaining access to any device or material attached directly to the headrest.

A corresponding method is also provided.

The above features and advantages and other features and advantages of the present disclosure are readily apparent from the following detailed description of the best modes for carrying out the disclosure when taken in connection with the accompanying drawings.

DESCRIPTION OF THE PREFERRED EMBODIMENTS

As discussed above, embodiments of the present disclosure relate to a storage and mounting device and more particularly to a headrest cover holder system as used to improve the storage and mounting of a personal electronic device on a headrest.

Generally, the invention is a sleeve or headrest cover for a seat on a bus, train or airplane that holds a tablet or other electronic device. Passengers no longer have use a folding tray behind an aircraft seat to place their electronic device. The headrest cover holder system includes a leather/vinyl (or other suitable material for hygienic cleaning) sleeve that may be placed over the headrest. The device includes a padded cushion on a front side for additional comfort and relaxation for passengers. The headrest cover holder system provides hands free comfort for passengers and eliminated the need to share a folding tray with beverages/food. A user no longer needs to use one's lap/knees or hands as a placeholder for an electronic device. The device may be used with any type of BLUETOOTH® device on buses, trains and airplanes with the folding tray acting as a desk/placeholder. Adjustable angle settings may be provided for various viewing. The device maintains full access to a screen, and all universal ports, speakers, microphones, cameras on an electronic device.

Figure 1:
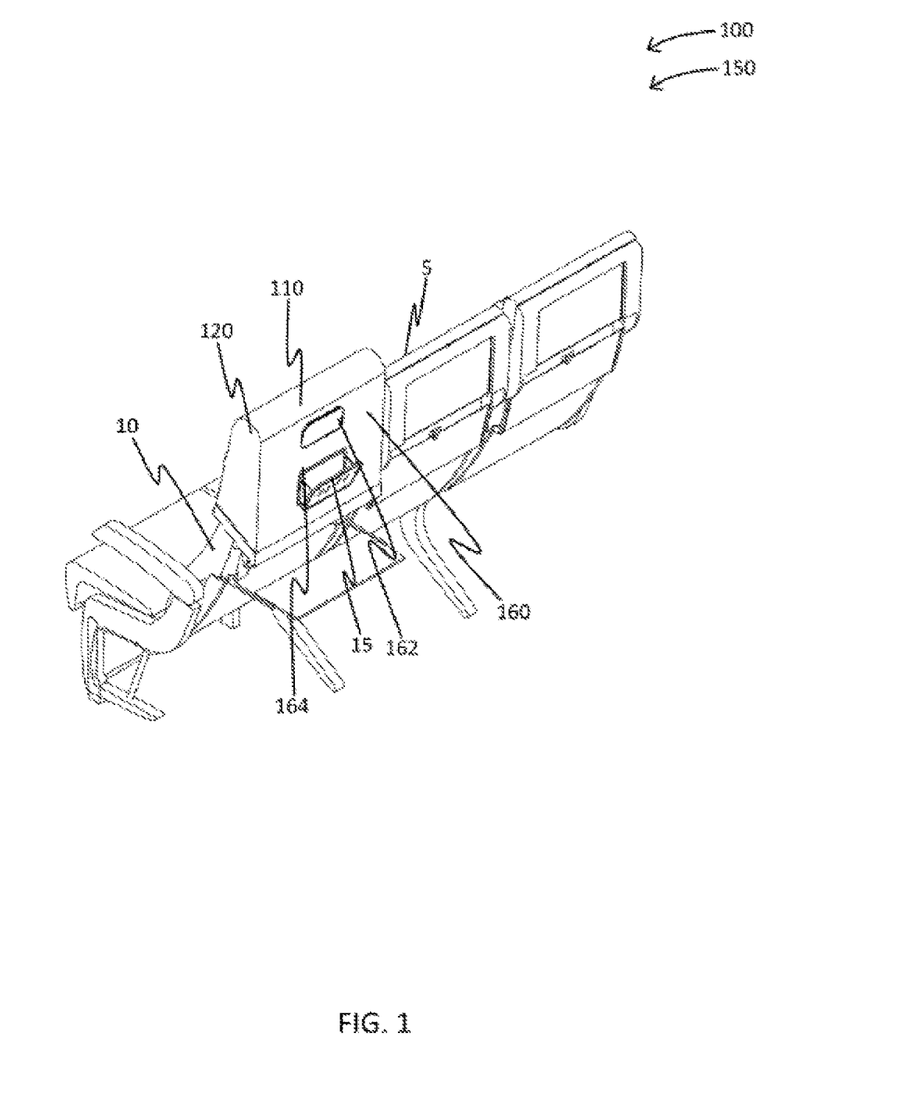
FIG. 1 is a perspective view of the headrest cover holder system during an "in-use" condition, according to an embodiment of the disclosure.

Referring now more specifically to the drawings by numerals of reference, there is shown in FIGS. 1-5, various views of a headrest cover holder system 100. FIG. 1 shows a headrest cover holder system 100 during an 'in-use' condition 150, according to an embodiment of the present disclosure. As illustrated, the headrest cover holder system 100 may include a sleeve 110 having a closed top-end 120, an open bottom-end 124, a front-surface 130, a rear-surface 160 including at least one cut-out 162, and an electronic device mount 164, and a fastener 166. The sleeve 110 comprises the closed top-end 120, the open bottom-end 124, the front-surface 130, the rear-surface 160, and the fastener 166 in functional combination. The sleeve 110 is configured to be removably installed on a headrest 5 of a seat 10 on a passenger-vehicle.

Figure 2A:
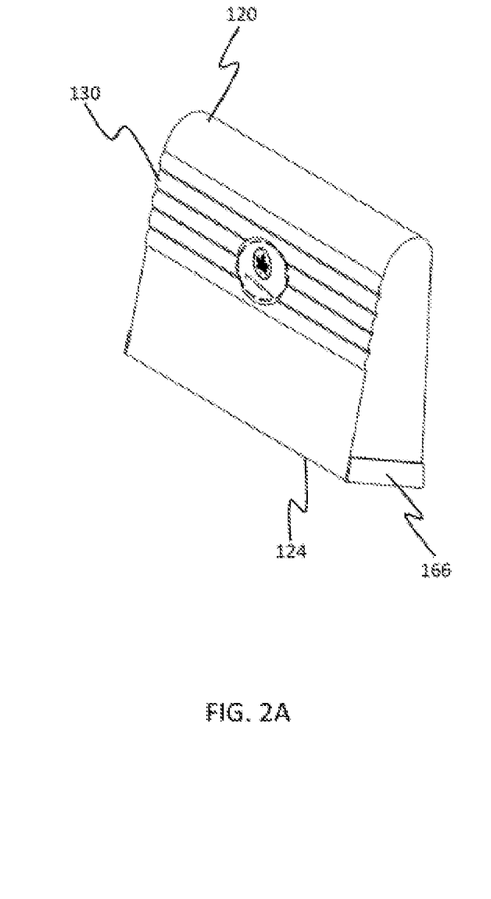
FIG. 2A is a perspective view of the headrest cover holder system of FIG. 1, according to an embodiment of the present disclosure.
Figure 2B:
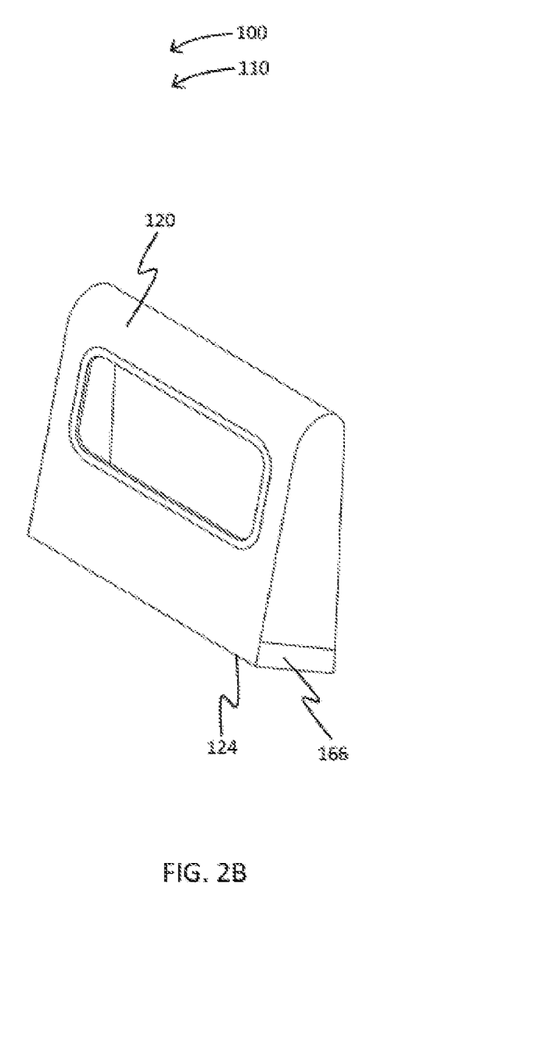
FIG. 2B is a perspective view of the headrest cover holder system of FIG. 1, according to an embodiment of the present disclosure.

FIGS. 2A and 2B show a perspective views of the headrest cover holder system 100 of FIG. 1, according to an embodiment of the present disclosure. As above, the headrest cover holder system 100 may include the sleeve 110 having the closed top-end 120, the open bottom-end 124, the front-surface 130, the rear-surface 160 including at least one cut-out 162, and the electronic device mount 164, and the fastener 166. The front-surface 130 is positioned on a front-side of a headrest 5, the closed top-end 120 is positioned on a top of the headrest 5, and the rear-surface 160 is positioned adjacent a rear-side of the headrest 5 during an in-use condition. As shown in FIG. 2B, the sleeve 110 may include a stretchable and expandable material to allow the device to retro-fit a head rest wing of certain aircraft chairs that have a head rest wing. Therefore, passengers have access to the head rest wing for adjusting side flaps of the head rest wing.

Figure 3:
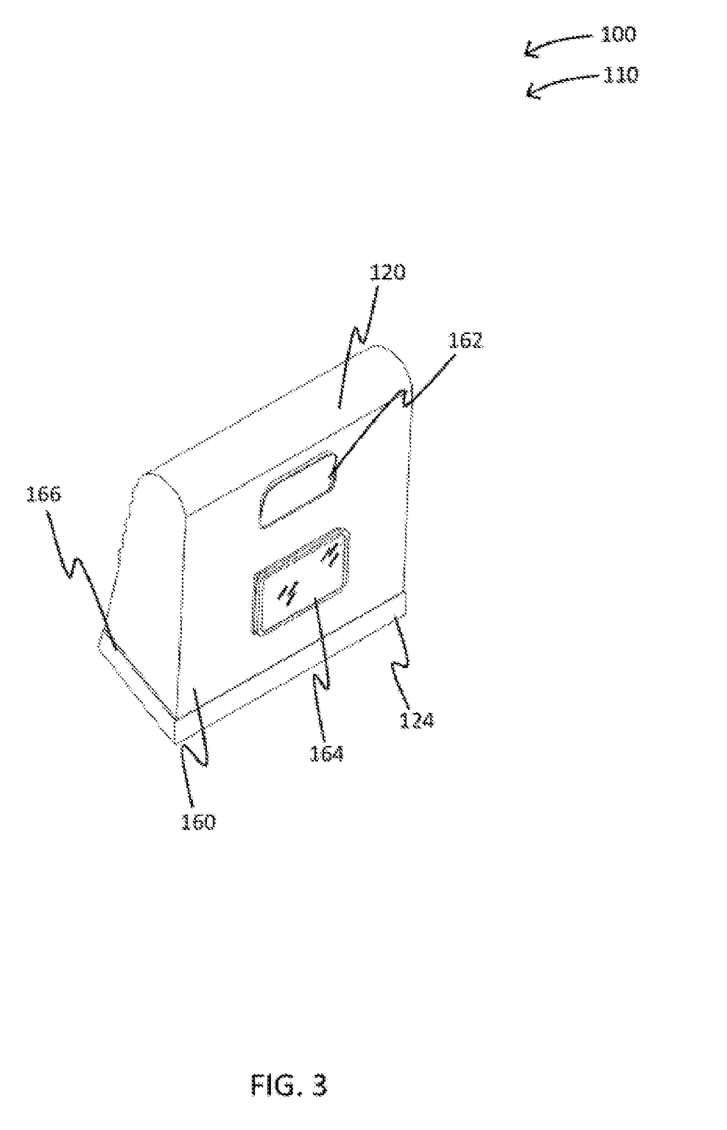
FIG. 3 is a perspective view of the headrest cover holder system of FIG. 1, according to an embodiment of the present disclosure.

Referring now to FIG. 3 showing a perspective view of the headrest cover holder system 100 of FIG. 1, according to an embodiment of the present disclosure. As above, the headrest cover holder system 100 may include the sleeve 110. The sleeve 110 is flexible and comprises washable material such as leather, vinyl, or other suitable material allowing the device to be cleaned and wiped down to maintain hygiene. The sleeve 110 includes a continuous piece of fabric encasing a right-side of the headrest, a left-side of the headrest, and the top of the headrest 5. The fastener 166 of the sleeve 110 comprises an elastic-fastener configured to secure the sleeve 110 to the seat 10 of the passenger-vehicle.

Figure 4:
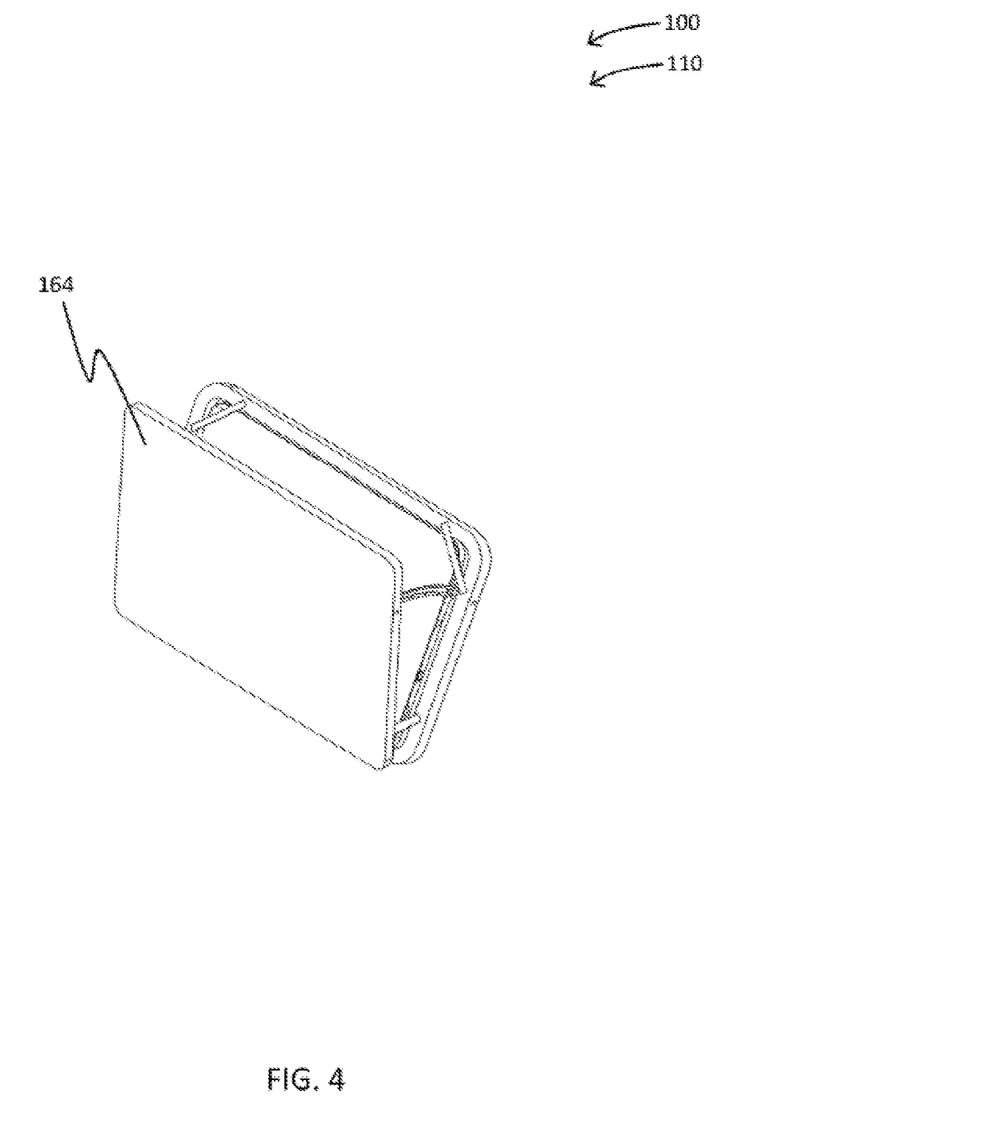
FIG. 4 is a perspective view of the headrest cover holder system of FIG. 1, according to an embodiment of the present disclosure.

FIG. 4 shows a perspective view of the headrest cover holder system 100 of FIG. 1, according to an embodiment of the present disclosure. As above, the headrest cover holder system 100 may include the sleeve 110 having the closed top-end 120, the open bottom-end 124, the front-surface 130, the rear-surface 160 including at least one cut-out 162, and the electronic device mount 164, and the fastener 166. The sleeve 110 configured to be removably installed on a headrest 5 of a seat 10 on a passenger-vehicle. The sleeve 110 is retrofittable to a variety of the passenger-vehicles. In a preferred embodiment, the passenger-vehicle comprises an airplane, bus, train or other passenger-vehicle. The open bottom-end 124 is configured to rest above a tray on the backside of the seat 10 of the passenger-vehicle and not extend past the tray. The at least one cut-out 162 is configured to provide access to items stored on a backside of the seat 10 on the passenger-vehicle such as an emergency card holder on an airplane. The at least one cut-out 162 is positioned above the electronic device mount 164. The at least one cut-out 162 comprises a substantially rectangular profile.

Figure 5:
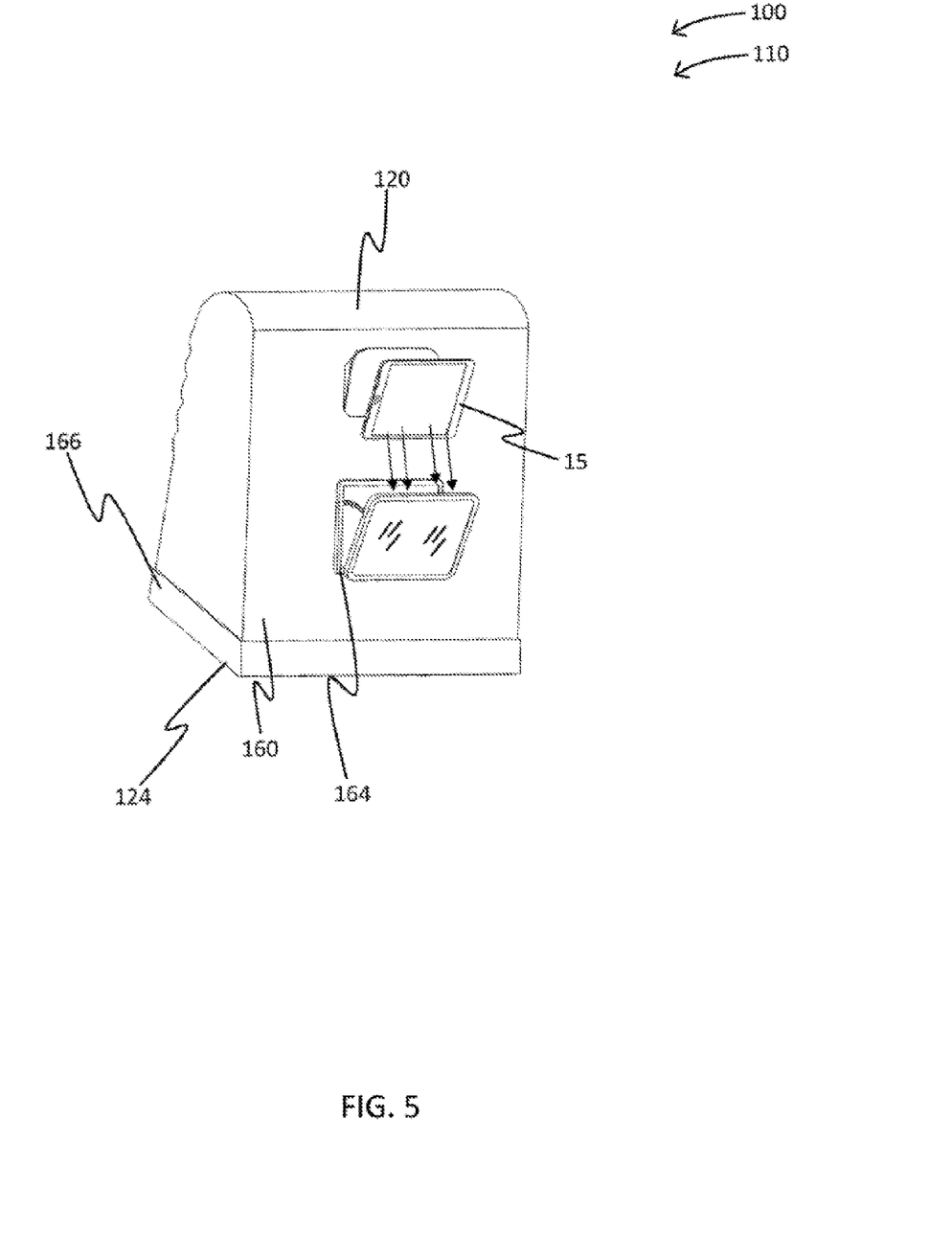
FIG. 5 is a perspective view of the headrest cover holder system of FIG. 1, according to an embodiment of the present disclosure.

Referring now to FIG. 5 showing a perspective view of the headrest cover holder system 100 of FIG. 1, according to an embodiment of the present disclosure. As above, the headrest cover holder system 100 may include the sleeve 110 having the closed top-end 120, the open bottom-end 124, the front-surface 130, the rear-surface 160 including at least one cut-out 162, and the electronic device mount 164, and the fastener 166. The front-surface 130 further comprises padding or a cushion to promote comfort of a passenger while seated with the device installed on the headrest 5 and a portion of a seat-back. The front-surface 130 may comprise functional indicia. The functional indicia may include advertising, company logos, or other desired indicia. The electronic device mount 164 is configured to receive an electronic-device 15 such as a tablet or mobile-phone for removable use. The electronic device mount 164 is adjustable and includes adjustable angle settings allowing a user to adjust an angle of the electronic-device 15 mounted within the electronic device mount 164.

FIGS. 6-11 schematically depict an alternative embodiment of a headrest cover holder system 200 in accordance with the claimed invention. Referring to FIGS. 6-11, wherein like reference numbers refer to like components throughout, the headrest cover holder system 200 includes a sleeve 204 that defines a cavity or chamber 208. More specifically, the sleeve 204 includes a front portion 212, a rear portion 216, a top portion 220, and lateral portions 224, 228 that cooperate to define the cavity or chamber 208 therebetween. The sleeve 204 includes a lower edge 232 that defines an opening 236 to the cavity or chamber 208. In the embodiment depicted, the front portion 212 also defines an opening 240 to the chamber 208. In the embodiment depicted, the rear portion 216 defines yet another opening 244 to the chamber 208. It should be noted that, within the scope of the claimed invention, a sleeve 204 may or may not include either of openings 240, 244. Thus, in one embodiment within the scope of the claims, a sleeve defines neither opening 240 nor opening 244. In other embodiments within the scope of the claims, the sleeve may define either or both openings 240, 244.

The sleeve 204 in the embodiment depicted is comprised of flexible fabric material. Those skilled in the art will recognize a variety of flexible fabric materials that may be employed within the scope of the invention, including, but not limited to, leather or vinyl. In the embodiment depicted, the lateral portions 224, 228 are comprised of an elastic fabric, such as but not limited to Spandex, while the rest of the sleeve 204 is a non-elastic, flexible fabric such as leather or vinyl. Accordingly, the elastic fabric enables the distance between the front portion 212 and the rear portion 216, and the size of the opening 236, to be selectively variable.

The head rest cover holder system 200 is configured for use with a vehicle seat 248. The vehicle seat 248 may be installed in any vehicle within the scope of the claimed invention, including, but not limited to, buses, airplanes, trains, etc. The vehicle seat 248 includes a seatback 252, which, as understood by those skilled in the art, extends generally vertically. The seatback 252 includes a front surface 256 against which an occupant of the seat 248 rests. The seat 248 includes a headrest portion 260, which may be an integral part of the seatback 252 as shown, or may be a separate unit attached to the seatback 252.

In the embodiment depicted, front surface 256 defines a protuberance 264 in the headrest portion 260. The protuberance 264 functions as a cushion or pillow to support the head of an occupant of the seat 248. When the sleeve 204 is unstressed, i.e., when the elastic fabric of lateral portions 224, 228 is not elastically strained, the width of the seatback 252, i.e., the distance from the rear surface 268 of the seatback 252 to the forwardmost point of the protuberance 264, is greater than the width of the opening 236 to the chamber 208. Accordingly, the protuberance 264 prevents the installation of the head rest cover holder system 200 to the headrest portion 260 when the sleeve 204 is in an unstressed state.

The elastic fabric material of lateral portions 224, 228 permits that installation of the head rest cover holder system 200 onto the headrest portion 260, while also facilitating a snug and reasonably tight secure fit of the system 200 on the headrest portion 260. More specifically, to install the head rest cover holder system 200, the sleeve 204 is moved such that the headrest portion 260 is inserted into the chamber 208 through the opening 236 defined by the lower edge 232. The elastic fabric of lateral portions 224, 228 is elastically strained by, for example, pulling the front portion 212 and the rear portion 216 away from each other, thereby to increase the width of the opening 236 and the chamber 208 to permit the passage of the protuberance 264 through the opening 236 and the chamber 208.

Figure 6:
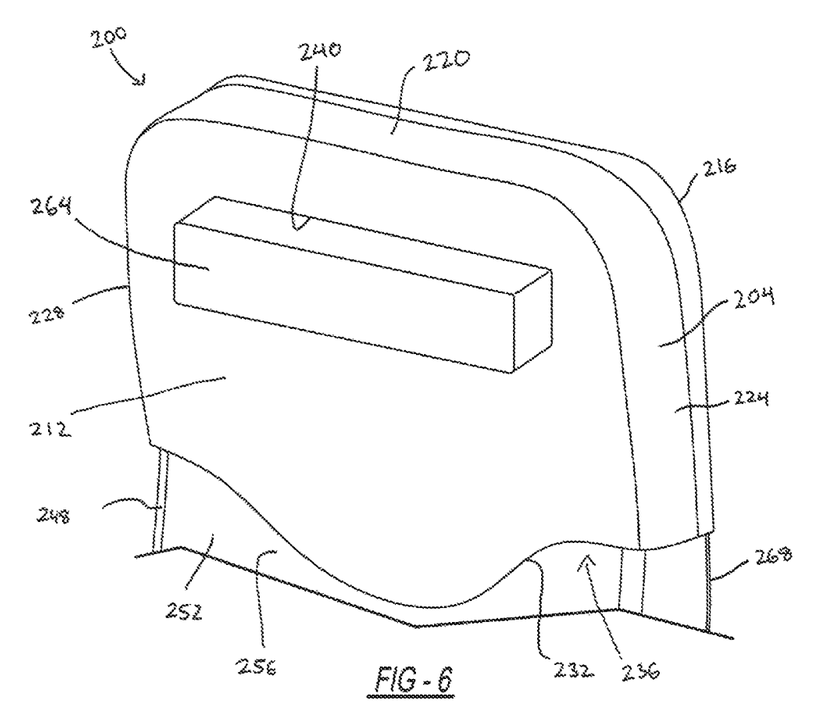
FIG. 6 is a front perspective view of another headrest cover holder system in accordance with the claimed invention installed on a headrest.
Figure 7:
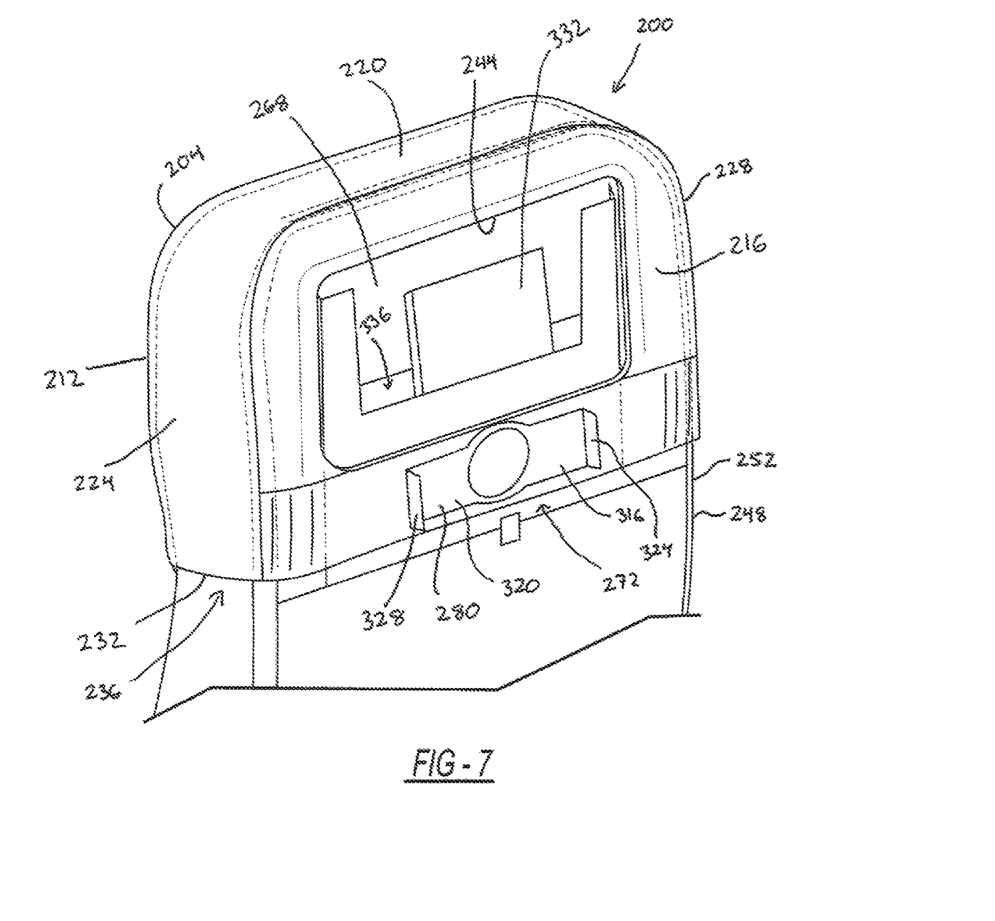
FIG. 7 is a rear perspective view of the headrest cover holder system of FIG. 6 installed on the headrest.
Figure 8:
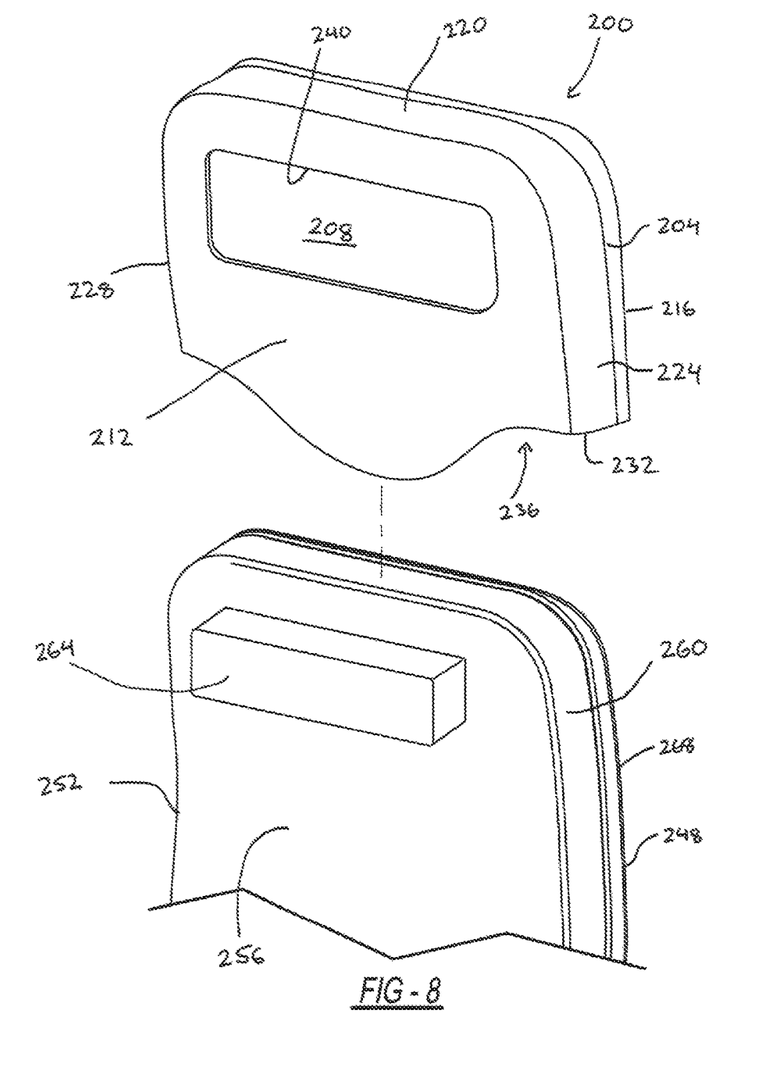
FIG. 8 is a front, perspective view of the headrest cover holder system of FIG. 6 in a position relative to the seat assembly prior to installation.
Figure 11:
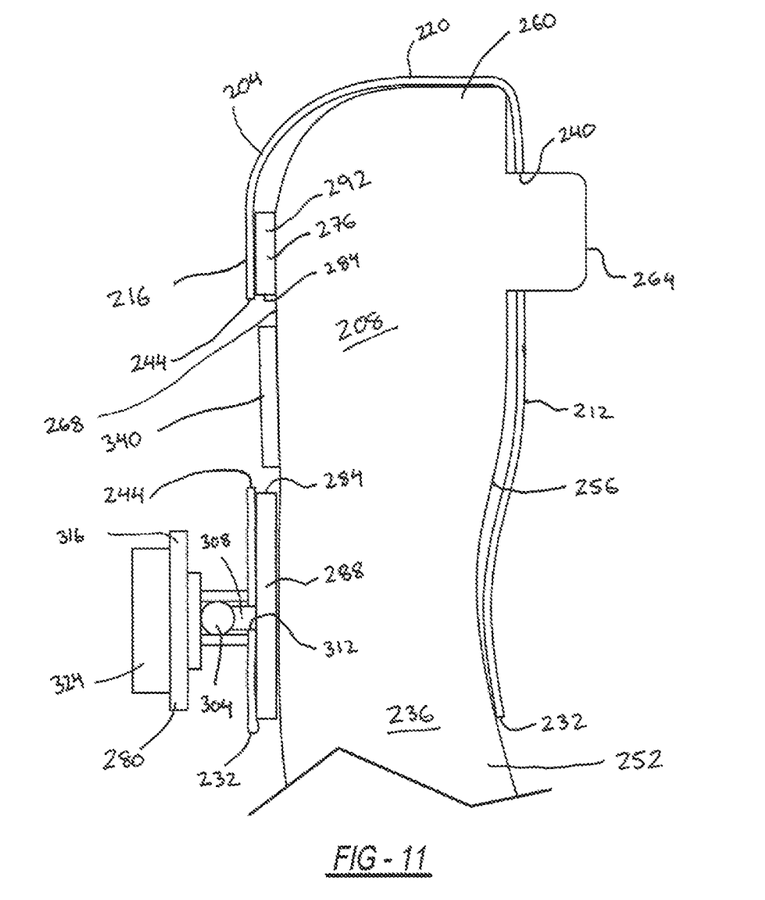
FIG. 11 is a schematic, cross-sectional, side view of the headrest cover holder system of FIG. 7 installed on a headrest with a screen.

In the embodiment depicted, insertion of the headrest portion 260 into the chamber 208 is complete when the top portion 220 of the sleeve contacts the top of the headrest portion 260 and the protuberance 264 extends out of the chamber 208 through the opening 240 in the front portion 212, as shown in FIGS. 6, 7, and 11. Permitting the sleeve 204 to return to its unstressed state will cause the opening 236 and the chamber 208 to narrow and provide a tight fit between the headrest portion 260 and the sleeve 204, which in turn improves aesthetics and stability of the system 200. It should be noted that, although the lateral portions 224, 228 comprise an elastic fabric in the embodiment depicted, lateral portions 224, 228 may also be comprised of non-elastic material within the scope of the claimed invention.

Figure 10:
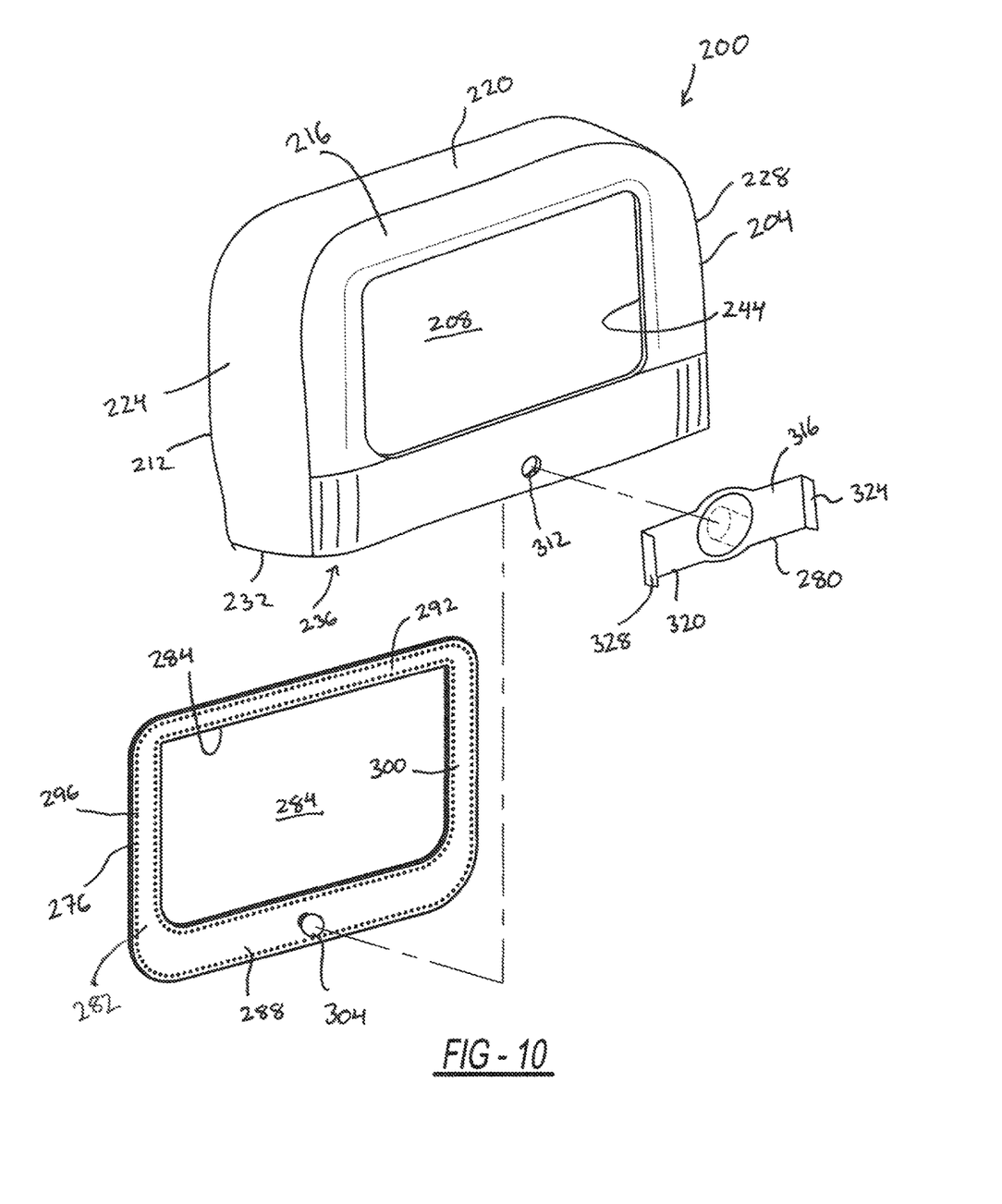
FIG. 10 is a rear, perspective, exploded view of the headrest cover holder system of FIG. 6.

The head rest cover holder system 200 also includes a holder assembly 272 having a bracket member 276 and an electronic device holder 280. The bracket member 276 is comprised of a generally rigid material, such as a hard polymer. The bracket member 276 includes a stabilizing portion 282 that is attached to the rear portion 216 of the sleeve 204 such that portion 282 is parallel with the rear portion 216. In the embodiment depicted, portion 282 of the bracket member 276 defines an aperture 284. In the embodiment depicted, the aperture 284 is rectangular, and is formed by four linear segments 288, 292, 296, 300 of the bracket member 276. Segments 288 and 292 extend parallel to one another and perpendicularly to segments 296 and 300. Segments 296 and 300 interconnect segments 288 and 292. The segments 288, 292, 296, 300 cooperate to define aperture 284 therebetween.

The bracket member 276 also includes an integrated fastener at which the electronic device holder 280 is connectable to the bracket member 276. In the embodiment depicted, the fastener is a ball 304 that cooperates with the electronic device holder 280 to form a ball and socket joint. Ball 304 is substantially spherical and is connected to segment 288 via a post 308 that extends perpendicularly from the segment 288. In the embodiment depicted, the ball 304, the post 308, and the segments 288, 292, 296, 300 are all formed by a single piece of material, such as by injection molding. This single-piece construction facilitates assembly of the head rest cover holder system 200. The post 308 may have any length or shape within the scope of the claimed invention.

More specifically, the segments 288, 292, 296, 300 defining the aperture 284 are attached to the rear portion 216 of the sleeve 204 such that the aperture 284 is aligned with the opening 244 in the sleeve 204. Segments 288, 292 are positioned on opposite sides of the opening 244 from one another, and segments 296, 300 are positioned on opposite sides of the opening 244 from one another. Those skilled in the art will recognize a variety of methods of attaching the segments 288, 292, 296, 300 to the rear portion 216 of the sleeve, including, but not limited to, sewing, adhesive bonding, etc.

The segments 288, 292, 296, 300 are positioned on the side of the rear portion 216 that faces the chamber 208, and are therefore not visible from the exterior of the chamber 208. Aperture 284 is larger than opening 244. Post 308 extends through a hole 312 in the rear portion 216 so that the ball 304 is positioned outside the chamber 208. The device holder 280 includes a socket that is matable with the ball 304 in a manner understood by those skilled in the art to form the ball and socket joint.

The device holder 280 in the embodiment depicted is a clamp mechanism having two clamp arms 316, 320, each having a respective flange 324, 328. An electronic device with a screen, such as a mobile phone or a tablet computer as shown at 15 in FIG. 5, is fittable between the flanges 324, 328 such that the flanges 324, 328 exert a force on opposite edges of the electronic device to releasably retain the device. The device holder 280 may be configured such that the distance between the flanges 324, 328 is selectively variable to accommodate electronic devices of different sizes. It should be noted that other electronic device holder configurations may be employed within the scope of the claimed invention.

When the head rest cover holder system 200 is installed on the headrest portion 260, a portion of the rear surface 268 of the seatback 252 and/or headrest portion 260 is visible and accessible from outside the chamber 208, as shown in FIGS. 7 and 11. More specifically, the portion of the rear surface 268 of the seatback 252 and/or headrest portion 260 is visible and accessible through the opening 244 in the rear portion 216 of the sleeve 204 and the aperture 284 formed by the bracket member 276. That is, a line of sight extends through aperture 284 and opening 244.

Figure 9:
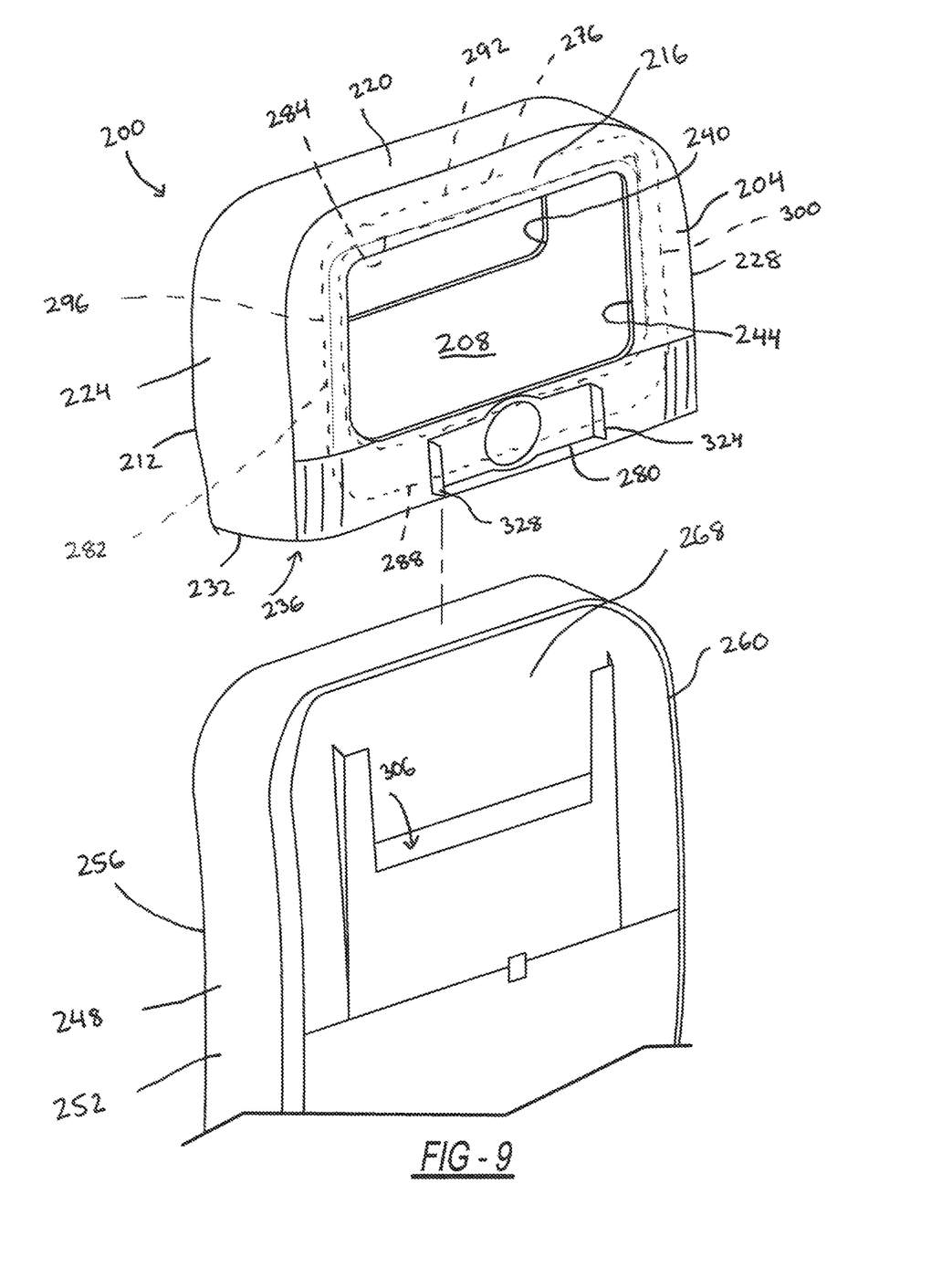
FIG. 9 is a rear, perspective view of the headrest cover holder system of FIG. 6 in a position relative to the seat assembly prior to installation

Accordingly, the occupant of a seat located behind the seatback 252 has access to the contents of the chamber 208 via the aperture 284 and the opening 244. Contents of the chamber 208 visible and accessible via the opening 244 and the aperture 284 may include printed material 332, such as a magazine or a card with flight safety information, that is stored in a slot 336 formed in the rear surface 268 of the headrest portion 260, as shown in FIGS. 7 and 9. Contents of the chamber 208 visible through the opening 244 and the aperture 284 may also include a screen 340 mounted to the rear of the headrest portion 260, as shown in FIG. 11. The screen 340 is part of what is referred to as an in-flight entertainment system (IFE) and is pre-installed to the seat 248 prior to the installation of the headrest cover holder system 200 to the seat 248.

The bracket member 276 provides enhanced stability for the electronic device holder 280, and any electronic device attached thereto, because the stabilizing portion 282, i.e., segments 288, 292, 296, 300, provide a large amount of surface area that interacts with both the sleeve 204 and the headrest portion 260 to prevent rotation of the bracket member 276, and, correspondingly, the device holder 280. The bracket member 276 achieves this enhanced stability while maintaining access to the rear of the headrest and anything attached or retained thereto by defining an aperture 284 that aligns with the opening 244, thereby ensuring that the opening 244 is not obstructed by the bracket member 276.

In one alternative embodiment (not shown), and within the scope of the claimed invention, portion 282 does not define an aperture. This alternative embodiment could be used with a sleeve 204 that does not have a rear opening 244 to the chamber 208.

While the best modes for carrying out the invention have been described in detail, those familiar with the art to which this invention relates will recognize various alternative designs and embodiments for practicing the invention within the scope of the appended claims.

The invention claimed is:

1. A cover assembly for a seat having a headrest, the cover assembly comprising:
   a flexible fabric sleeve defining a chamber and a first opening to the chamber;
   said chamber being sized and shaped to at least partially contain the headrest;
   said first opening being sized and positioned such that at least a portion of the headrest is insertable into the chamber through the first opening; and
   a bracket member being attached to the sleeve, said bracket member having a fastening element at which an electronic device holder is connectable to the bracket member;
   wherein the sleeve defines a rear portion;
   wherein the bracket member includes a stabilizing portion that is substantially parallel to the rear portion;
   wherein the stabilizing portion of the bracket member defines an aperture;
   wherein the sleeve defines a second opening; and
   wherein the aperture is aligned with the second opening such that a line of sight extends through the second opening and the aperture.

2. The cover assembly of claim 1, wherein the bracket member includes a post interconnecting the fastening element and the stabilizing portion;
   wherein the sleeve defines a hole; and
   wherein the post extends through the hole.

3. The cover assembly of claim 2, wherein the stabilizing portion, the post, and the fastening element are formed by a single piece of material.

4. The cover assembly of claim 1, wherein the fastening element is a ball.

5. The cover assembly of claim 1, further comprising a device holder configured to retain an electronic device; said device holder being operatively connected to the bracket member via the fastening element.

6. A seat assembly comprising:
   a seatback and a headrest portion;
   a headrest cover having a sleeve defining a chamber, a first opening, and a second opening;
   said headrest portion being positioned within the chamber and extending through the first opening;
   said headrest cover being positioned relative to the headrest portion such that the second opening to the chamber is positioned to the rear of the headrest portion;
   a bracket member having a stabilizing portion defining an aperture and mounted with respect to the sleeve such that the aperture is aligned with the second opening; and
   a device holder configured to retain an electronic device and mounted to the bracket member.

7. The seat assembly of claim 6, further comprising a video screen mounted to the headrest portion inside the chamber and visible outside the chamber through the second opening and aperture.

8. The seat assembly of claim 6, further comprising printed matter at least partially disposed within the chamber and visible through the second opening and aperture.

9. The seat assembly of claim 6, wherein the aperture and the second opening are rectangular.

10. The seat assembly of claim 6, wherein the aperture is larger than the second opening.

11. The seat assembly of claim 6, wherein the bracket member includes first, second, third, and fourth segments that define the aperture;
    wherein the first, second, third, and fourth segments are mounted to the sleeve inside the chamber.

12. A method for use with a seat assembly having a headrest, the method comprising:
    obtaining a headrest cover having a sleeve and a bracket member;
    said sleeve defining a chamber, a first opening to the chamber, and a second opening to the chamber;
    said bracket member defining an aperture and being attached to the sleeve such that the aperture is aligned with the second opening;
    moving the headrest cover relative to the headrest so that the headrest enters the chamber through the first opening;
    wherein the seat assembly includes a screen mounted to the headrest; and
    wherein said moving the headrest cover relative to the headrest includes positioning the headrest cover such that the screen is visible through the second opening and the aperture.

13. A method for use with a seat assembly having a headrest, the method comprising:
    obtaining a headrest cover having a sleeve and a bracket member;
    said sleeve defining a chamber, a first opening to the chamber, and a second opening to the chamber;
    said bracket member defining an aperture and being attached to the sleeve such that the aperture is aligned with the second opening;
    moving the headrest cover relative to the headrest so that the headrest enters the chamber through the first opening;
    wherein the seat assembly is configured to store printed material; and
    wherein said moving the headrest cover relative to the headrest includes positioning the headrest cover such that the printed material is accessible through the second opening and the aperture.

14. The method of claim 13, further comprising inserting or removing the printed material through the second opening and the aperture.

\* \* \* \* \*